United States Patent

Hubert

[11] Patent Number: 5,850,993
[45] Date of Patent: Dec. 22, 1998

[54] SPACECRAFT THRUSTER OPERATION FOR IMPROVED ORBITAL MANEUVER ACCURACY

[75] Inventor: Carl Henry Hubert, Cranbury, N.J.

[73] Assignee: Martin Marietta Corp., East Windsor, N.J.

[21] Appl. No.: 519,441

[22] Filed: Aug. 25, 1995

[51] Int. Cl.$^6$ .................................................. B64G 1/26
[52] U.S. Cl. ........................................................ 244/169
[58] Field of Search .................................. 244/169, 164, 244/172, 171, 170; 364/434, 459

[56] References Cited

U.S. PATENT DOCUMENTS

| | | | |
|---|---|---|---|
| 3,907,226 | 9/1975 | Neufeld et al. | 244/169 |
| 3,937,423 | 2/1976 | Johansen | 244/3.22 |
| 3,944,172 | 3/1976 | Becker | 244/169 |
| 3,977,633 | 8/1976 | Keigler et al. | 244/169 |
| 3,984,071 | 10/1976 | Fleming | 244/169 |
| 4,288,051 | 9/1981 | Gaschel | 244/169 |
| 4,537,375 | 8/1985 | Chan | 244/169 |
| 4,961,551 | 10/1990 | Rosen | 244/169 |
| 4,991,393 | 2/1991 | Otten et al. | 60/204 |
| 5,335,179 | 8/1994 | Boka et al. | 244/169 |
| 5,395,076 | 3/1995 | Lechtin et al. | 244/169 |
| 5,400,252 | 3/1995 | Kazimi et al. | 244/169 |

FOREIGN PATENT DOCUMENTS

| | | | |
|---|---|---|---|
| 2001186 | 6/1978 | United Kingdom | G05D 1/08 |

*Primary Examiner*—Galen L. Barefoot
*Attorney, Agent, or Firm*—W. H. Meise; C. A. Berard; S. A. Young

[57] ABSTRACT

A spacecraft includes a body defining a center of mass, and an attitude control system, for generating attitude error signals representing deviation of the body from a desired attitude. A plurality of thrusters mounted on the body have nominally parallel thrust components, in a particular direction. The thrusters are arranged in pairs, which produce opposed torques. A velocity change controller is coupled to the thrusters, for generating pulsatory firing command signals for the thrusters for a particular total time duration, for achieving a desired velocity change in the desired direction. A thruster control system is coupled to the attitude control system and to the thrusters, for causing the thrusters of the pair to be fired in a differential manner, and with the relative pulse width of the first and second portions of the pulse cycle being controlled in response to the attitude error signals to vary the torque about the center of mass for attitude control, while maintaining constant the total firing time of the thrusters. Since the total firing time of the thrusters of the pair is constant, the $\Delta V$ is unaffected by attitude control.

2 Claims, 2 Drawing Sheets

SPACECRAFT THRUSTER OPERATION FOR IMPROVED ORBITAL MANEUVER ACCURACY

FIELD OF THE INVENTION

This invention relates to spacecraft thruster control systems, and more particularly to control systems for thrusters used for velocity change maneuvers.

BACKGROUND OF THE INVENTION

A velocity change ($\Delta V$) must often be imparted to a spacecraft, for stationkeeping or other purposes. Such a velocity change is often implemented by commanding the firing of multiple thrusters for a fixed amount of time, or for a fixed number of pulses. Operation of the thrusters, however, may create disturbance torques, which perturb the spacecraft attitude. The attitude perturbations, in turn, require additional thruster operations in order to maintain the desired attitude.

The thrusters which must be operated to correct attitude may be among those which are operated to achieve the desired velocity change. In such a situation, attitude is controlled by either OFF-pulsing or ON-pulsing the thrusters. OFF-pulsing is used when the thrusters are required to be constantly firing in order to achieve the desired $\Delta V$. If $\Delta V$ is provided by continuously-firing thrusters, OFF-pulse control involves generating torques by briefly turning off and then on a subset of the continuously firing thrusters. If $\Delta V$ is provided by pulsed thrusters, on the other hand, OFF-pulse control torques are generated by shortening the pulses of a subset of the pulsing thrusters. ON-pulsing is used when the $\Delta V$ is achieved by a number of pulses of nominally fixed duration. In ON-pulsing, attitude control pulses are interleaved with velocity change pulses, so that a subset of the thrusters which are periodically pulsed ON to provide the velocity change, are also pulsed briefly to provide attitude correction torque; this may be accomplished by discrete additional pulses, or by lengthening the $\Delta V$-controlling pulses of some of the thrusters. OFF-pulsing cannot provide three-axis control torques, but at best only two-axis control, because OFF-pulsing can only generate torque about axes perpendicular to the $\Delta V$ vector. Consequently, the third axis of control must be provided by ON-pulsing a separate set of thrusters.

The accuracy of a $\Delta V$ maneuver depends on the accuracy of the total thruster impulse. For each individual thruster, the impulse is the thruster force multiplied by its total firing time, where the total firing time is the sum of the durations of all pulses fired by that thruster. The total thruster impulse for a given maneuver is the sum of the impulses applied by all thrusters that are active during that maneuver. Both ON- and OFF-pulsing results in deviation from the nominal thruster impulse and therefore deviation from the nominal $\Delta V$. ON-pulsing necessarily lengthens the duration of the operation of the thrusters, and tends to increase the resulting $\Delta V$. OFF-pulsing reduces the $\Delta V$ to below the nominal value. Unfortunately, the change in $\Delta V$ which would correct for the attitude-control-engendered pulsing cannot be readily predicted, because it depends upon spacecraft parameters which cannot be known exactly, such as the location of the center of mass, torques due to thruster plume impingement on rotating solar arrays, and the like. After the maneuver, ground-based operators can readily determine the amount of attitude control pulsing that occurred by examining the telemetry data; but the greatest maneuver accuracy requires prior knowledge of the effect of attitude control thrusting.

Improved thruster control arrangements are desired.

SUMMARY OF THE INVENTION

A spacecraft includes a body having or defining a center of mass, and an attitude control system coupled to the body, for generating and responding to attitude error signals representative of deviation of the body from a particular attitude. A plurality of thrusters are mounted on the body, with nominally mutually parallel thrust components in a particular direction. The thrusters are arranged in pairs, which, when fired, produce substantially opposed torques about the center of mass. A velocity change ($\Delta V$) control system is coupled to the thrusters, for generating signals commanding pulsed firing of certain ones of the thrusters (depending upon the direction of velocity change) for a particular total on-time duration, for effecting a desired velocity change in the particular direction. The thrusters are nominally fired simultaneously in pairs. The thruster control system is coupled to the attitude control system and to the thrusters, for causing the duration of the thruster pulses applied to the thrusters to be varied in a differential manner, with a first thruster of each pair being fired with a slightly longer duration than nominal during each thruster pulse cycle, and a second thruster of each pair being fired for a slightly shorter duration than nominal during each thruster pulse cycle, so that the relative pulse widths of the on-portion of each pulse cycle are controlled in response to the attitude error signals to vary the torque about the center of mass to tend to maintain the particular attitude, while maintaining unchanged the total thrust impulse provided by each of the pairs of thrusters. Thus, the invention solves the problem of prior knowledge of the effect of attitude control thrusting by causing the attitude control activity to have a neutral effect on the $\Delta V$, so that $\Delta V$ is not affected thereby.

DESCRIPTION OF THE INVENTION

Figure 1:
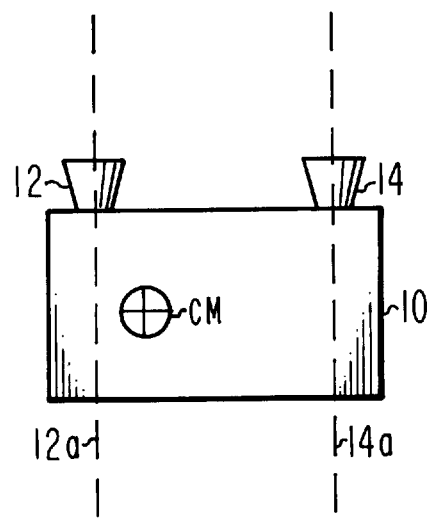
FIG. 1 is a simplified diagram illustrating a pair of thrusters with mutually parallel lines of action, which produce mutually opposed torques on a body when fired.
Figure 2:
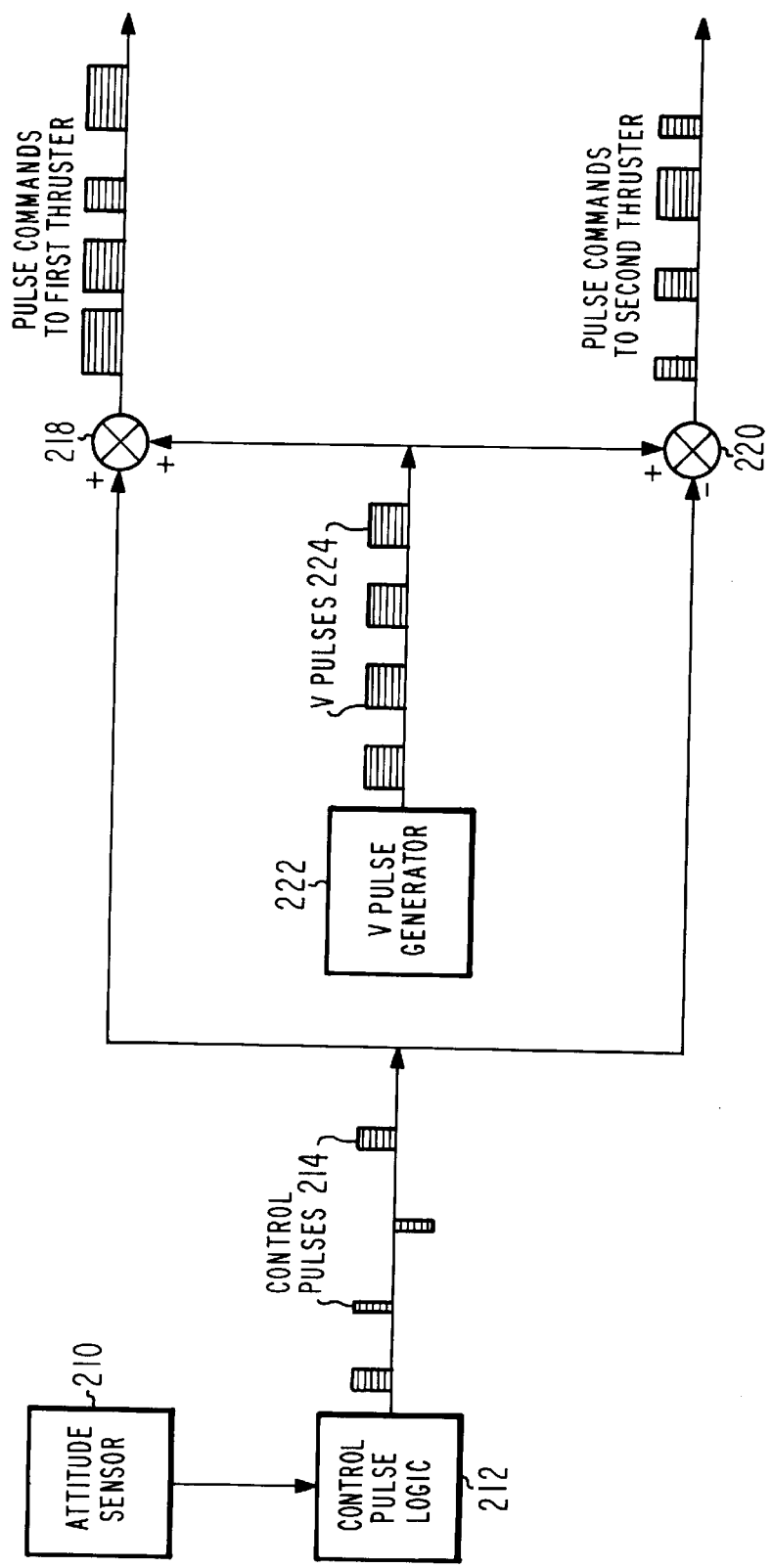
FIG. 2 is a simplified block diagram of a system which combines signals for velocity change and attitude control is a manner such that total impulse per pulse cycle is independent of attitude control activity.

In FIG. 1, a body 10 carries a first thruster 12 and a second thruster 14, which have mutually parallel lines of action 12a and 14a, which pass on either side of center of mass CM. The magnitudes of their thrusts are nominally equal. When thruster 12 fires, a counterclockwise torque (as seen in FIG. 1) is applied to the body, and a clockwise torque occurs when thruster 14 fires. Assuming that the moment of inertia of body 10 is large, so that changes in attitude occur slowly, it is easy to see that firing of either thruster 12 or 14 creates a downward force, tending to accelerate body 10 downward to cause a velocity change ($\Delta V$), as well as changing its attitude by rotation. Clearly, the desired $\Delta V$ can be achieved without any attitude-changing torques, so long as thrusters 12 and 14 are fired for the time appropriate for their thrusts and moment arms FIG. 2 is a simplified block diagram of a thruster controller according to an aspect of the invention, and which includes an attitude sensor 210, a control pulse logic which generates thruster pulse commands in response to attitude errors, $\Delta V$ pulse logic which generates thruster pulse commands to implement a needed velocity change, and summing junctions that combine the control pulses and $\Delta V$ pulses into net pulse commands to the individual thrusters. In FIG. 2, attitude sensor 210 produces attitude-representative signals, which are applied to an attitude control pulse logic circuit 212. Pulse logic circuit 212 produces differential attitude control pulses, designated generally as 214, which are applied to noninverting (+) and inverting (−) input ports of summing circuits 218 and 220, respectively. A velocity pulse generator illustrated as a block 222 produces periodic velocity pulses, illustrated as 224, which represent, by their nominal duration, the desired impulse required to produce the desired ΔV. The velocity pulses 224 are applied to noninverting input ports of summing circuits 218 and 222. Summing circuit 218 sums its input pulses, while summing circuit 220 subtracts. The summed pulses are applied to control the thrusters of a pair of thrusters. As a result, for a particular direction of attitude control, the total duration of the pulses applied to a first thruster of the pair being controlled become longer than nominal by an amount dependent on the desired attitude control, and the pulses applied to the other thruster of the pair becomes shorter by the same amount. Thus, the total commanded impulse required to produce the desired ΔV remains the same, regardless of the amount of attitude control torque involved.

The invention is best illustrated by a simple example using the two-thruster configuration shown in FIG. 1. A velocity change maneuver is to be implemented by simultaneously firing both thrusters 12 and 14 N times. Each thruster has a nominal pulse width; $P_1$ seconds for thruster 1, and $P_2$ seconds for thruster 2. For most spacecraft configurations $P_1$ and $P_2$ would be equal. If both thrusters apply the same force, $F_0$, then the thruster impulse per pulse and the cumulative impulse for the maneuver are $$I_{pulse} = F_0(P_1+P_2) \tag{1}$$

$$I_{maneuver} = NF_0(P_1+P_2)$$

Control torque is applied by making equal and opposite changes to the individual thruster pulses. For example, the pulse width of thruster 12 could be increased to $(P_1+\delta)$ and the pulse width of thruster 14 decreased to $(P_2-\delta)$. The cumulative impulse is thus unchanged $$I_{pulse} = F_0[(P_1+\delta)+(P_2-\delta)] = F_0(P_1+P_2) \tag{2}$$

Because the impulse per pulse is independent of attitude control activity (i.e., independent of the size of δ, the ΔV per pulse is independent of the attitude control activity. Hence, accurate a priori knowledge of the ΔV can be achieved.

Although the concept is illustrated above using a single pair of equally sized thrusters, the invention is not limited to that case. Any number and combination of thrusters can be used. For example, consider a configuration with four equal-sized thrusters with nominal pulse widths of $P_1$, $P_2$, $P_3$, and $P_4$. In this case, attitude is controlled by applying pulse width variations of $\delta_1$, $\delta_2$, $\delta_3$, and $\delta_4$ subject to the constraint that $$\delta_1+\delta_2+\delta_3+\delta_4=0 \tag{3}$$

By meeting this constraint, the impulse per pulse is independent of attitude control activity $$I_{pulse} = F_0[(P_1+\delta_1)+(P_2+\delta_2)+(P_3+\delta_3)+(P_4+\delta_4)] = F_0(P_1+P_2+P_3+P_4) \tag{4}$$

This technique could also be used if the four thrusters applied four different forces ($F_1$, $F_2$, $F_3$, $F_4$). The constraint equation becomes $$F_1\delta_1+F_2\delta_2+F_3\delta_3+F_4\delta_4=0 \tag{5}$$

and the impulse per pulse is $$\begin{aligned} I_{pulse} &= F_1(P_1+\delta_1) + F_2(P_2+\delta_2) + \\ &\quad F_3(P_3+\delta_3) + F_1(P_4+\delta_4) \\ &= F_1P_1 + F_2P_2 + F_3P_3 + F_4P_4 \end{aligned} \tag{6}$$

As before, the impulse per pulse and the ΔV per pulse is independent of control activity.

Other embodiments of the invention will be apparent to those skilled in the art. For example, while a single-axis control has been described, multi-axis control is effected in essentially the same manner along each axis being controlled. Attitude control according to the invention may also be used in conjunction with a pair of thrusters in which the thrust axes are skewed in opposite directions relative to the direction of the desired ΔV, and will be neutral in the direction ΔV, but may add some undesired ΔV in an orthogonal plane; when East-West stationkeeping is involved, the undesired ΔV is usually in a radial direction, and has little effect on the orbit.

What is claimed is:

1. A spacecraft, comprising:

a body defining a center of mass:

attitude sensing means coupled to said body, for generating attitude error signals representative of deviation of said body from a particular attitude;

a plurality of thrusters mounted on said body, with mutually parallel thrust components in a particular direction, said thrusters being arranged in pairs, with the thrusters in each pair producing substantially opposed torques about said center of mass;

velocity change control means coupled to said plurality of thrusters, for generating signals commanding firing of the thrusters of at least one of said pairs of thrusters, said firing being performed in pulses having a nominal on-durations during each firing cycle, for a particular total firing time duration, for thereby effecting a desired velocity change (ΔV) in said particular direction; and thruster control means coupled to said attitude control means and to said pair of thrusters, for causing said on-pulse durations of said thrusters of said pair to be controlled in a differential manner, with a first thruster of said pair being fired for a duration greater than nominal by a selected amount during each said firing cycle, and a second thruster of said pair being fired for a duration less than nominal by said selected amount during the corresponding firing cycle, said selected amount of differential control during each firing cycle being in response to said attitude error signals, to vary said torque about said center of mass, while maintaining constant ΔV.

2. A spacecraft according to claim 1, wherein said thruster control means comprises complementary signal generation means for generating first and second mutually complementary thruster-ON signals during each of said pulse cycles, for application to said first and second thrusters, respectively.

* * * * *